(12) United States Patent
Godkin

(10) Patent No.: US 6,870,285 B2
(45) Date of Patent: Mar. 22, 2005

(54) LONG STROKE LINEAR VOICE COIL ACTUATOR WITH THE PROPORTIONAL SOLENOID TYPE CHARACTERISTIC

(75) Inventor: Mikhail Godkin, San Diego, CA (US)

(73) Assignee: BEI Technologies, Inc., San Francisco, CA (US)

(*) Notice: Subject to any disclaimer, the term of this patent is extended or adjusted under 35 U.S.C. 154(b) by 29 days.

(21) Appl. No.: 10/080,870

(22) Filed: Feb. 22, 2002

(65) Prior Publication Data

US 2002/0117904 A1 Aug. 29, 2002

Related U.S. Application Data

(60) Provisional application No. 60/271,902, filed on Feb. 27, 2001.

(51) Int. Cl.[7] .................. H02K 41/00; H02K 33/00
(52) U.S. Cl. ................. 310/12; 310/13; 310/15; 381/412; 381/421
(58) Field of Search .............. 310/12, 13, 15; 381/412, 421

(56) References Cited

U.S. PATENT DOCUMENTS

| | | | | |
|---|---|---|---|---|
| 5,149,996 A | * | 9/1992 | Preston | 310/12 |
| 5,345,206 A | * | 9/1994 | Morcos | 335/222 |
| 5,808,379 A | | 9/1998 | Zhao | 310/12 |

FOREIGN PATENT DOCUMENTS

| | | | | |
|---|---|---|---|---|
| DE | 0259569 | | 3/1988 | G02B/6/42 |
| DE | 1024588 | | 8/2000 | H02K/41/035 |
| EP | 0451773 | | 10/1991 | H02K/41/035 |
| EP | 0701314 | * | 3/1996 | H02K/35/04 |
| JP | 173968 | | 7/1987 | H02K/33/18 |
| JP | 62-173968 | * | 7/1987 | H02K/33/18 |

OTHER PUBLICATIONS

PCT International Search Report mailed Jul. 2, 2002.

* cited by examiner

Primary Examiner—Dang Le
Assistant Examiner—Iraj A. Mohandesi
(74) Attorney, Agent, or Firm—DLA Piper Rudnick Gray Cary US LLP

(57) ABSTRACT

A voice coil actuator is disclosed which provides a proportional solenoid type characteristic and in which first and second magnets are positioned at different ends of a first soft magnetic pole piece and magnetized in opposite directions, the first soft magnetic pole piece having a length greater than the length of the first magnet and the length of the second magnet. A coil having a length less than the lengths of the first soft magnetic pole piece is positioned for travel along an axis common to the first soft magnetic pole piece and first and second magnets, and a structure provides a magnetic path between free ends of the first and second magnets.

7 Claims, 6 Drawing Sheets

CLOSED-ENDED CYLINDRICAL ACTUATOR

OPEN-ENDED CYLINDRICAL ACTUATOR

LONG STROKE LINEAR VOICE COIL ACTUATOR WITH THE PROPORTIONAL SOLENOID TYPE CHARACTERISTIC

RELATED APPLICATIONS

The present application claims priority under 35 U.S.C. §119(e) from provisional application No. 60/271,902, filed Feb. 27, 2001.

TECHNICAL FIELD

The present invention relates generally to long stroke cylindrical voice coil actuators, and more particularly to a long stroke cylindrical voice coil actuator with characteristics similar to that of a proportional solenoid.

BACKGROUND ART

A typical long stroke cylindrical linear voice coil actuator 10 consists of an outer shell 12, a long axially magnetized magnet 14, a short soft magnetic pole 16 and a long heavy coil 18, such as is illustrated in FIG. 1. FIG. 1 provides one-half of a longitudinal cross-section view of such a conventional cylindrical actuator with an open end. The bottom-most horizontal line is a centerline of the actuator. The actuator of FIG. 1 usually has a bell-shaped Force vs. Stroke curve, such as illustrated in FIG. 2. However, in applications where the highest force is required at the beginning of the travel, a different design is needed. The Force vs. Stroke characteristic for such an actuator would be a straight line, similar to that of a proportional solenoid. However, the slope of a proportional solenoid's Force vs. Stroke characteristic is determined by a spring, and furthermore, proportional solenoids are unidirectional devices. Therefore, there is a need for a linear voice coil actuator design which has a linear Force vs. Stroke characteristic, which does not depend upon a spring for such characteristic, and which operates bi-directionally.

SUMMARY OF THE INVENTION

The above requirements are met by the present invention of a voice coil actuator comprising first and second magnets, a first soft magnetic pole piece having a length greater than the length of the first magnet and the length of the second magnet, wherein the first and second magnets are positioned at different ends of the first soft magnetic pole piece and magnetized in opposite directions, a coil having a length less than the lengths of the first soft magnetic pole piece and positioned for travel along an axis common to the first soft magnetic pole piece and first and second magnets, and a structure which provides a magnetic path between free ends of the first and second magnets.

In a closed-end embodiment of the present invention, a shell of magnetically permeable material is positioned about the first and second magnets and the first soft magnetic pole and coupled to the free ends of the first and second magnets. Slots are provided in the shell through which the coil assembly can be linked to the load. In the closed end embodiment, the first and second magnets can have substantially the same length.

In an open ended embodiment of the present invention, a second soft magnetic pole piece is positioned at a free end of the first magnet, and a shell of magnetically permeable material is positioned about the first and second magnets, and first and second soft magnetic pole pieces so that an opened end is provided at the second soft magnetic pole piece and the shell is in contact with the free end of the second magnet.

The linear voice coil actuator of the subject application, as described below, can be considered a bridge between the solenoid and voice coil actuator technologies. The Force vs. Stroke characteristic of such an actuator is a straight line with the slope toward the direction of motion. But there is no spring, and the direction of motion can be changed by a simple change of the polarity of voltage applied to the coil. Unlike the solenoid, since the moving part of the actuator does not have any magnetic material, there is no hysteresis.

Since the linear voice coil actuator design of the subject application utilizes a relatively small volume of permanent magnet material, its cost is lower than the cost of a conventional actuator (prior art) designed for the same stroke.

These and other features and advantages of the present invention will be more readily understood upon consideration of the following detailed description of the invention and accompanying drawings.

DETAILED DESCRIPTION OF THE INVENTION

According to the present invention, two different configurations of a long stroke voice coil actuator with the proportional solenoid type characteristic are described: a closed-ended design, and an open-ended design.

Figure 1:
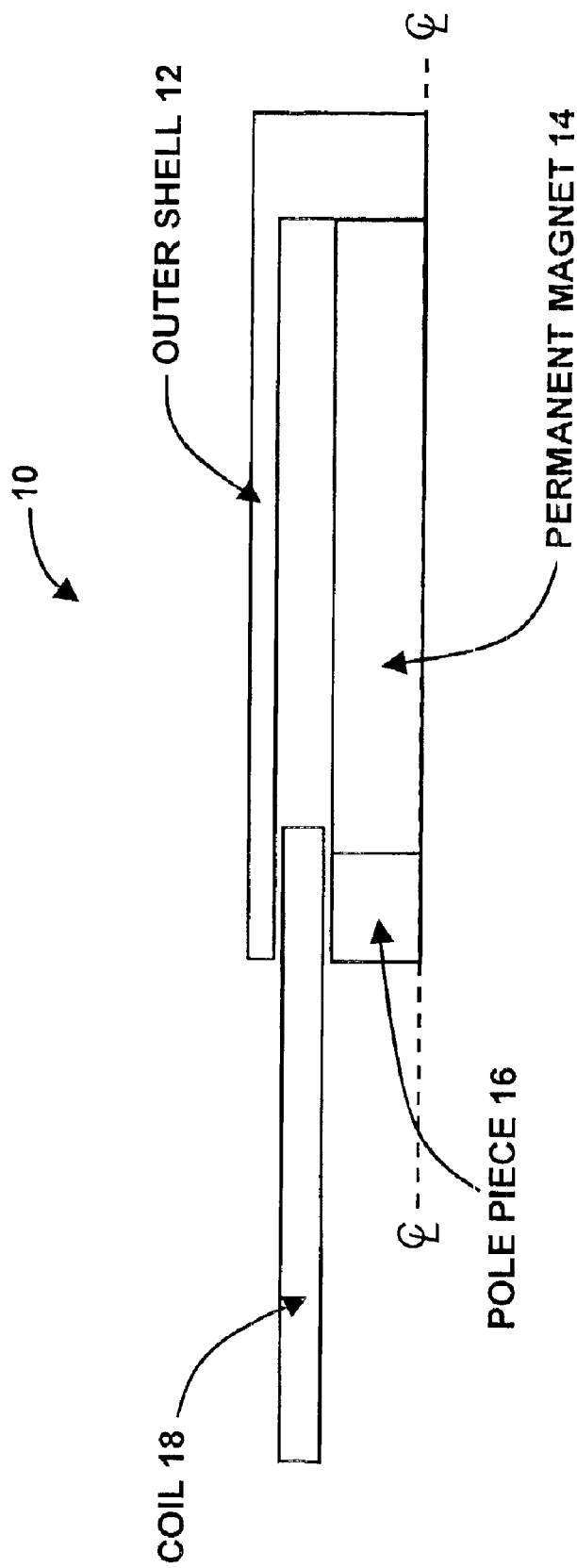
FIG. 1 shows a simplified, one-half longitudinal cross-section of a conventional cylindrical actuator with an open end.
Figure 2:
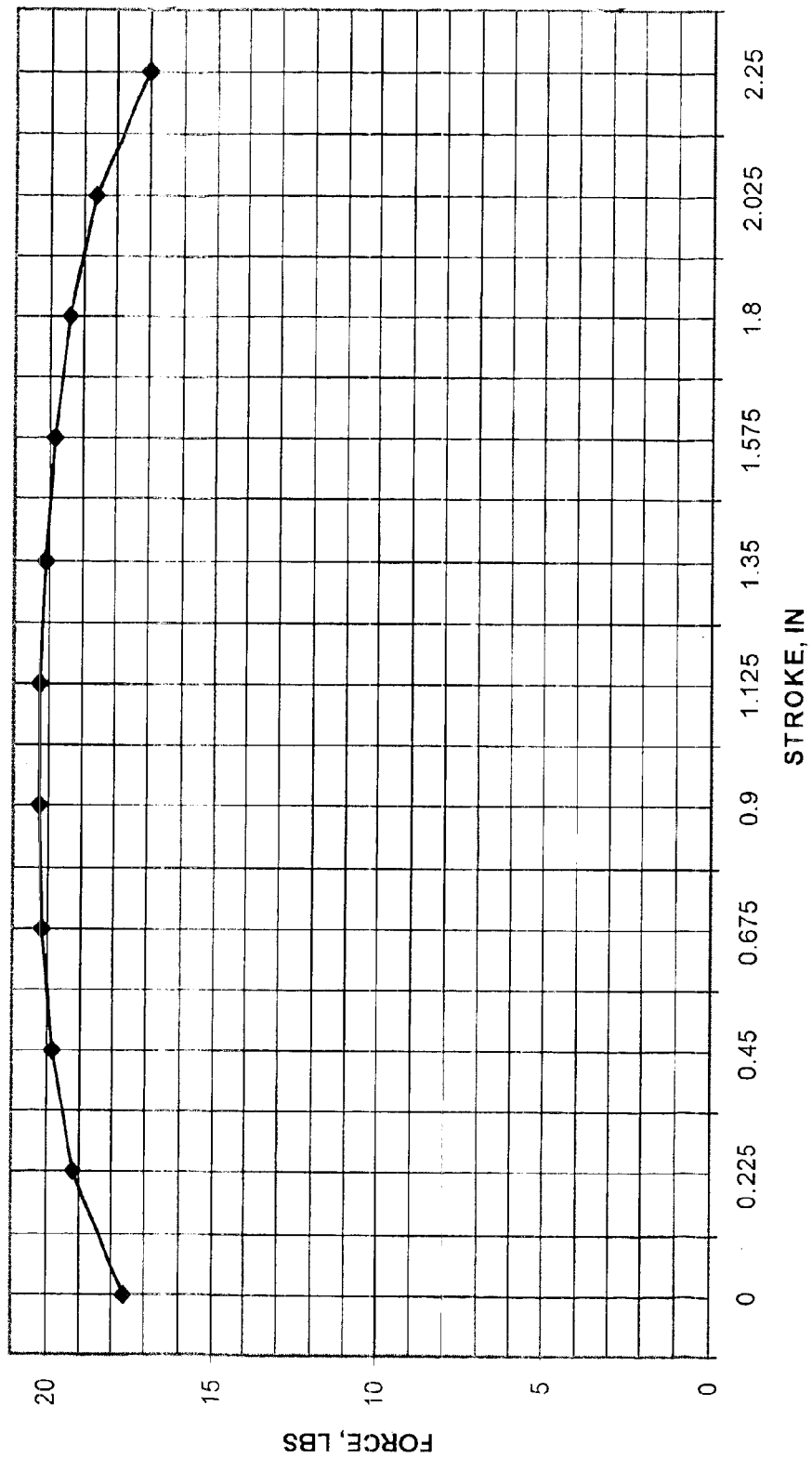
FIG. 2 shows a typical Force vs. Stroke curve for the actuator of FIG. 1.
Figure 3:
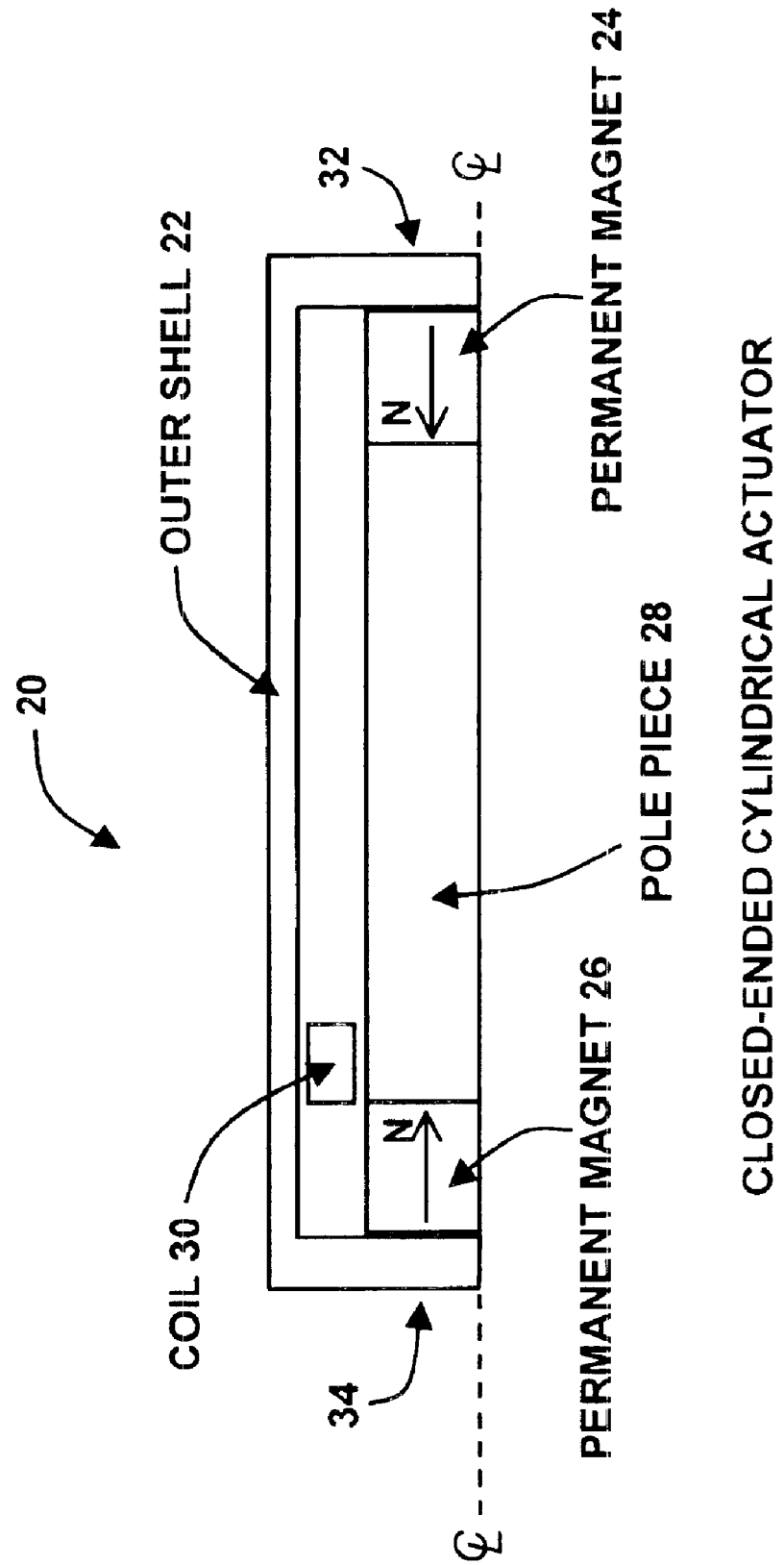
FIG. 3 shows a simplified one-half longitudinal cross-section of a closed-ended cylindrical actuator in accordance with the present invention.

A closed-ended configuration 20 in accordance with the present invention is shown in a one-half longitudinal cross section in FIG. 3. This configuration includes an outer shell 22 with two longitudinal slots (not shown) to bring out mechanical links from the coil assembly (not shown) to the load (not shown), two permanent magnets 24 and 26 of identical length and magnetized in opposite directions, a long soft magnetic pole piece 28, and a short and relatively light coil 30 suitable for servo applications. In FIG. 3, the length of the two magnets is taken parallel to the long axis of the actuator, and the magnetization polarities of the two magnets are indicated by arrows and the letter "N." The normal component of the flux density in the air gap of such an actuator is constant throughout the entire stroke except for a little fall off at the beginning and the end of the travel. Force vs. Stroke characteristics of this actuator for both directions of motion are shown in FIG. 4.

Figure 4:
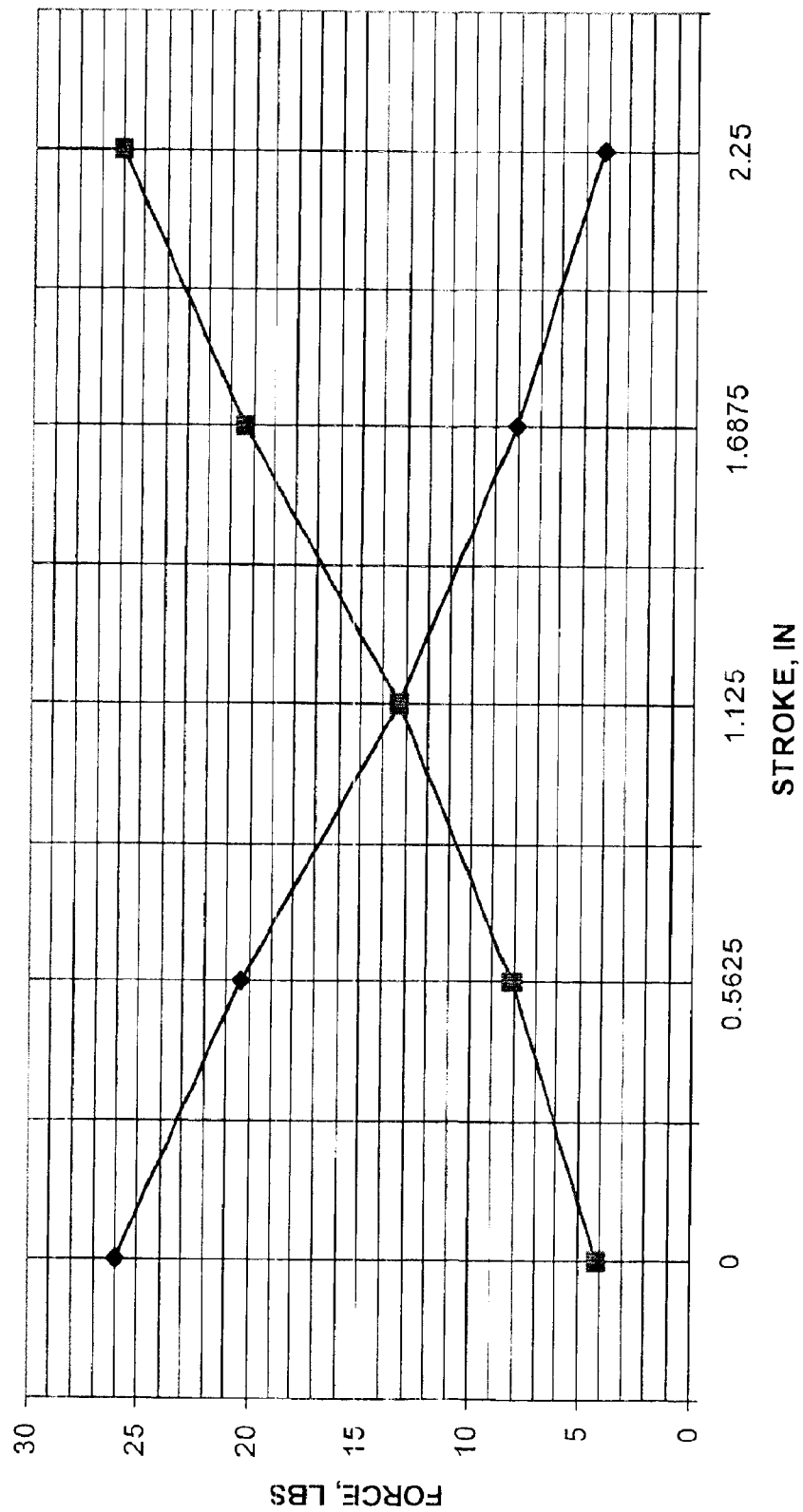
FIG. 4 shows Force vs. Stroke curves for the closed-ended cylindrical actuator of FIG. 3 for left-to-right and right-to-left movement.

Thus, as can be seen from FIG. 4, the length of soft magnetic pole piece 28 is several times greater than the length of either of magnets 24 or 26. Magnet 24 is positioned at one end of pole piece 28 and magnet 26 is positioned at the other end of pole piece 28. In the embodiment shown in FIG. 4, the north poles, N, of magnets 24 and 26 face one another separated by pole piece 28. It is to be understood that other magnetic pole orientations can be used, for example the magnets 24 and 26 can be positioned so that their south poles, S, face one another separated by pole piece 28.

Outer shell 22 is formed of magnetically permeable material and encases coil 30, permanent magnets 24, 26 and pole piece 28. One end 32 of outer shell 22 is positioned adjacent the free end of magnet 24, while end 34 of outer shell 22 is positioned adjacent the free end of magnet 26. In the preferred embodiment, permanent magnets 24, 26 are in direct contact with ends 32 and 34, respectively, of outer shell 22. It is to be understood, however, that other coupling configurations can be used between the magnets 24, 26 and outer shell 22 within the spirit of the present invention. It is also to be understood, that other mechanical links from the coil assembly to the load can be employed, such as the holes or slots through the actuator ends 32 or 34.

Since connection of the coil assembly to the load in the closed-ended design may sometimes be difficult, an open-ended design may be preferred. The normal component of the flux density in the air gap of this open-ended device should also be constant within most of the travel. Such a design is depicted in FIG. 5, which provides a cross section of an open-ended design in accordance with the present invention.

Features of this configuration 40 include two permanent magnets 42 and 44 of different lengths and magnetized in opposite directions, a long soft magnetic pole piece 46, and a short soft magnetic pole piece 48 that is used as a part of the return path for the magnetic circuit. The coil 50 is short and light, and positioned about coil base 51. The proper ratio between the lengths of the pole piece 48 and pole piece 46 has been determined. The proper ratio between the lengths of the permanent magnet 42 and permanent magnet 44 has also been established. One such ratio is one-half—1:2.

Figure 5:
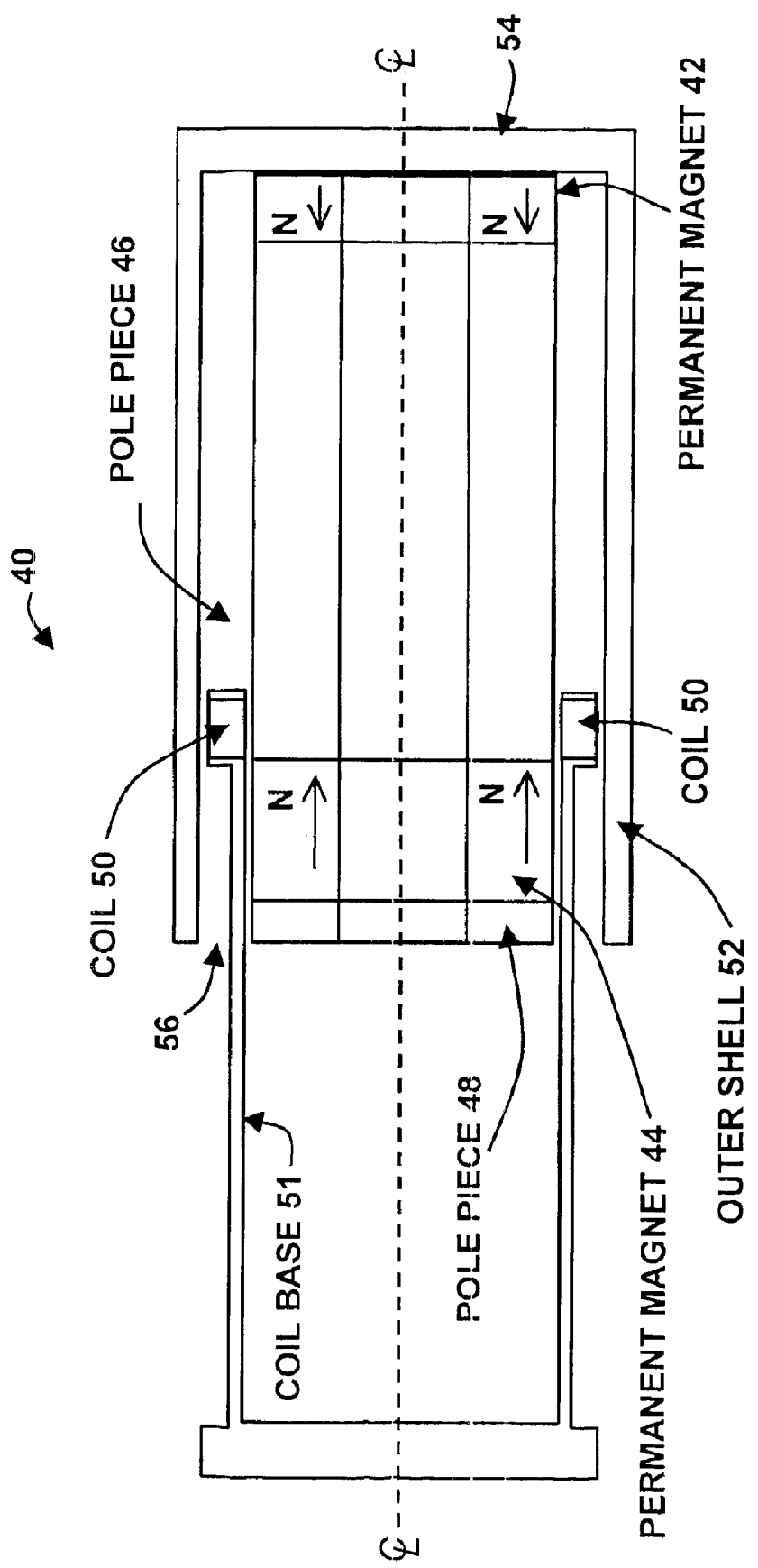
FIG. 5 shows a simplified longitudinal cross-section of an open-ended cylindrical actuator in accordance with the present invention.

From FIG. 5 it can be seen that outer shell 52 has a closed end 54 and an open end 56. Permanent magnet 42 is positioned to have one of its poles adjacent one end of long pole piece 46, and permanent magnet 44 is positioned adjacent the other end of long pole piece 46. If magnet 42 has its north pole, N, facing long pole piece 46, then magnet 44 will also be positioned so that its north pole, N, is facing long pole piece 46; vice versa. Short pole piece 48 is positioned adjacent the free end of magnet 44, and so that its free end is positioned in the open end 56 of outer shell 52. The free end of magnet 42 is positioned adjacent the closed end 54 of outer shell 52. In the preferred embodiment of the open ended configuration 40 of the present invention, the free end of permanent magnet 42 is in direct contact with the closed end 54 of outer shell 52, however, other coupling arrangements can be used within the spirit of the invention.

In one embodiment of the open-ended configuration 40 of the present invention, magnet 44 is substantially twice the length of magnet 42, the short pole piece 48 has a length no greater than that of magnet 42, and the outer shell 52 has a portion which extends from a point near short pole piece 48 to near the free end of magnet 42. Furthermore, the length of the long soft magnetic pole piece 46 is greater than the length of either of permanent magnets 42 and 44, and the length of coil 50 is less than the length of the long soft magnetic pole piece 46.

In the open-ended embodiment illustrated in FIG. 5, short pole piece 48 has a length approximately one and a half times that of coil 50. Coil 50 has a length that is slightly less than the length of permanent magnet 42. Permanent magnet 44 has a length approximately twice that of permanent magnet 42. Long pole piece 46 has a length that is approximately four (4) times the length of permanent magnet 44.

Figure 6:
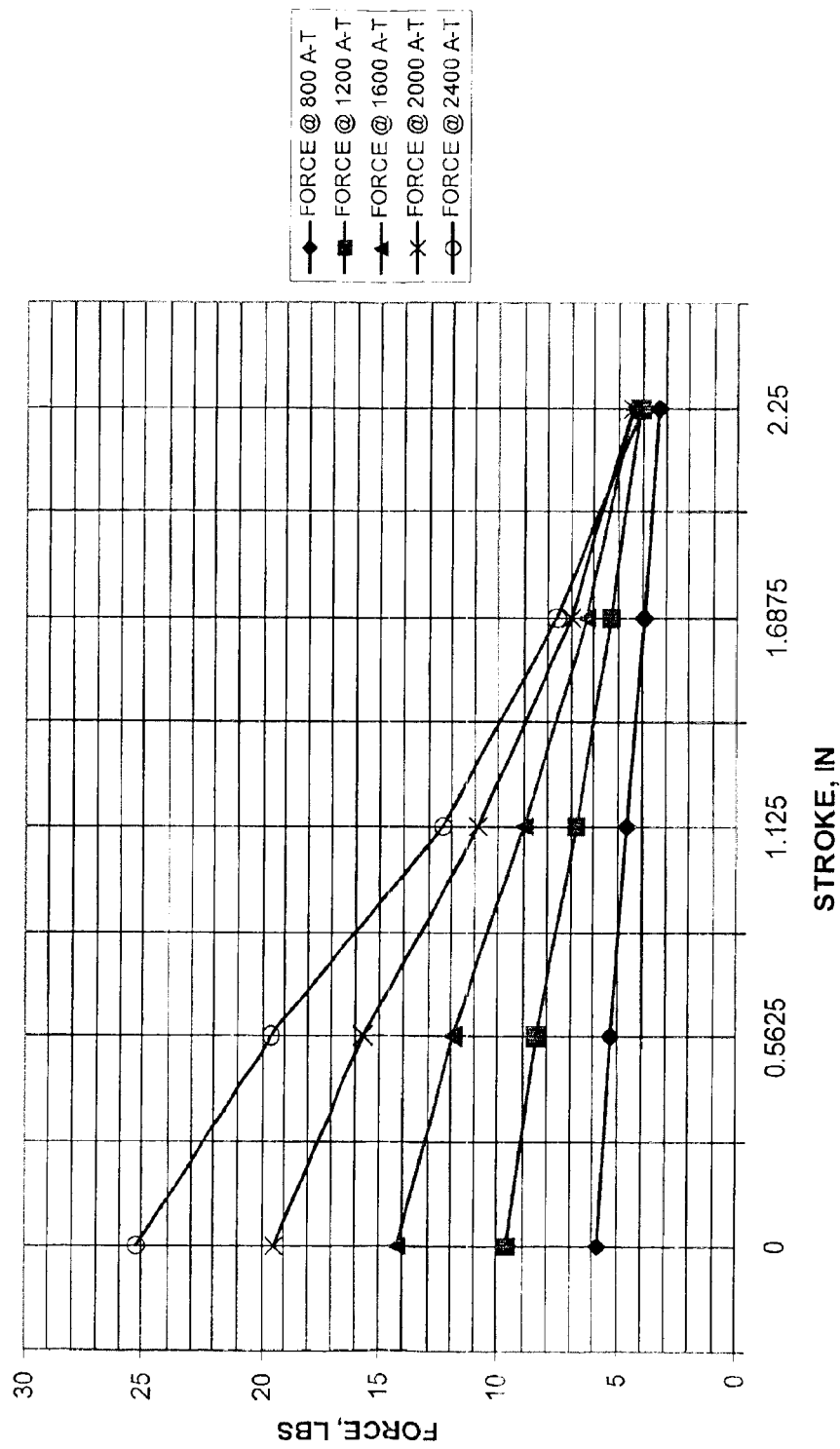
FIG. 6 shows Force vs. Stroke curves for the open-ended cylindrical actuator of FIG. 5 for different numbers of ampere-turns for the coil.

Force vs. Stroke characteristics of an open-ended design of the present invention at different numbers of Ampere-turns in the coil are presented on FIG. 6. It should be noted that the slope of each line depends on the current in the coil that can be interpreted as an "electromagnetic spring" constant.

Force developed by the actuator can be described by the following equation:

$$F = F_{const} - K(x - s/2),$$

where
- $F_{const}$ is the force at mid-stroke without taking into account the spring effect;
- K is "electromagnetic spring" constant;
- x is a coordinate along direction of motion;
- s is a total stroke.

"Electromagnetic spring" constant is determined by the geometry, magnetic materials and the amount of current in the coil. For a given geometry, it is strictly a function of current. This constant, for example, can be obtained from each characteristic depicted in FIG. 6 as follows:

$$K = 2(F_0 - F_{const})/s,$$

where $F_0$ is the force developed by an actuator at the beginning of the stroke.

The terms and expressions which have been employed herein are intended as terms of description and not of limitation, and there is no intent in the use of such terms and expressions of excluding equivalents of the features shown and described, or portions thereof, it being recognized that various modifications are possible within the scope of the invention claimed.

What is claimed is:

1. A voice coil actuator comprising
   a first magnet having a length;
   a second magnet having a length;
   a first soft magnetic pole piece having a length greater than the length of the first magnet and the length of the second magnet, wherein the first and second magnets are positioned at different ends of the first soft magnetic pole piece and magnetized in opposite directions;
   a coil having a length less than the length of the first soft magnetic pole piece and positioned for travel along an axis common to the first soft magnetic pole piece and first and second magnets; and
   a structure which provides a magnetic path between free ends of the first and second magnets, and
   wherein the lengths of the first and second magnets and the first soft magnetic pole piece are selected to provide a force versus stroke characteristic in which a force is provided which is greater at one end of a stroke of the voice coil actuator and decreases to a lowest level at an other end of the stroke.

2. A voice coil actuator comprising
   a first magnet;
   a second magnet;
   a first soft magnetic pole piece positioned between the first and second magnets along a common axis, wherein the first and second magnets are magnetized in opposite directions, and the first soft magnetic pole piece has a length greater than a length of the first magnet and a length of the second magnet along the common axis;

a coil having a length less than the length of the first soft magnetic pole piece and positioned for travel along the common axis; and a structure which provides a magnetic path between free ends of the first and second magnets.

3. The voice coil actuator of claims 1 or 2, wherein the length of the first magnet is substantially the same as the length of the second magnet.

4. The voice coil actuator of claims 1 or 2, wherein the length of the first magnet is substantially twice the length of the second magnet, and further including a second soft magnetic pole piece positioned along the common axis at the free end of the first magnet and having a length no greater than the length of the first magnet, and a shell portion which extends from a point near the second soft magnetic pole piece to the free end of the second magnet.

5. A closed-ended cylindrical voice coil actuator comprising a first magnet;

a second magnet;

a first soft magnetic pole piece positioned between the first and second magnets along a common axis, wherein the first and second magnets are magnetized in opposite directions, and the first soft magnetic pole piece has a length greater than two times a length of the first magnet or a length of the second magnet along the common axis;

a coil having a length less than the length of the first soft magnetic pole piece, and less than the length of the first or the second magnets, and positioned for travel along the common axis; and a shell of magnetically permeable material positioned about the first and second magnets and the first soft magnetic pole piece, coupled to the free ends of the first and second magnets, and having two longitudinal slots through which a coil assembly is linked to the load.

6. A open-ended cylindrical voice coil actuator comprising a shell of magnetically permeable material;

a first magnet;

a second magnet;

a first soft magnetic pole piece positioned between the first and second magnets along a common axis, wherein the first and second magnets are magnetized in opposite directions, and the first soft magnetic pole piece has a length greater than a length of the first magnet and a length of the second magnet along the common axis;

a coil having a length less than the length of the first soft magnetic pole piece and positioned for travel along the common axis; and a second soft magnetic pole piece positioned at a free end of the first magnet, wherein the shell is positioned about the first and second magnets and the first and second magnetic pole pieces to provide an open end at the second magnetic pole piece and to be in contact with the second magnet.

7. The voice coil actuator of claim 2, wherein the length of the coil is less than the length of the second magnet, the length of the first magnet is greater than the length of the second magnet, and the length of the first soft magnetic pole piece is approximately four times the length of the first magnet.

* * * * *